June 28, 1960 E. P. NEATE 2,942,844
TURBINE NOZZLE
Filed Dec. 22, 1952

Inventor
Elroy P. Neate
By
Willis, Helmig & Baillio
Attorneys

United States Patent Office 2,942,844
Patented June 28, 1960

2,942,844

TURBINE NOZZLE

Elroy P. Neate, Indianapolis, Ind., assignor to General Motors Corporation, Detroit, Mich., a corporation of Delaware Filed Dec. 22, 1952, Ser. No. 327,355

6 Claims. (Cl. 253—78)

My invention relates to turbine nozzles and the like and, more particularly, to a turbine nozzle structure particularly adapted to gas turbine installations. It will be understood, however, that the principles of the invention may be applied to analogous installations. It will also be understood that within the term "nozzle" may be embraced not only the first stage nozzle but intermediate stage nozzles or diaphragms of multistage turbines.

The principal object of the invention is to provide a structure of this sort better adapted to withstand the extremely rigorous conditions of aircraft gas turbine service than nozzle arrangements previously known. In this connection, it is well known that the temperatures employed in such engines are extremely high and are highest at the turbine nozzle. It is also known that the engines are quickly started and stopped and sometimes are subject to flame-outs and to over-temperature conditions in service, all of which give rise to rapid temperature changes and high stresses due to expansion of the hot parts of the nozzle.

A turbine nozzle for an axial flow turbine ordinarily comprises an outer shroud ring and an inner shroud rings, these defining the boundaries of the motive fluid path, and a large number of vanes extending generally radially between the shroud rings. It has been found impracticable to make this entire assembly a single rigid lattice with continuous inner and outer shroud rings and vanes fixed at both ends to both shroud rings, because stresses occasioned by thermal expansions and accompanied by gas loading have resulted in distortion and destruction of nozzle structures.

The conventional approach to this problem has been to form one or both of the shroud rings as a plurality of segments to provide expansion gaps in the shroud rings.

In principle, my invention involves employing continuous shroud rings and providing a loose connection between the vanes and one of the shroud rings. It also involves provision for radial expansion of the shroud rings with respect to other parts of the turbine on which they are mounted where such provision is desirable, as normally it may be expected to be. A feature of the invention is improved provision for centering the nozzle by limited contact with the turbine casing when the nozzle is hot.

The principles of the invention and the advantages thereof will be more clearly apparent to those skilled in the art from the succeeding detailed description and the accompanying drawings, in which.

The invention is illustrated herein as applied to an engine (a turbo-jet engine of the J33 series) illustrated only sufficiently to make clear the structure pertinent to the invention. Since the general structure and operation of the engine are widely known and understood, the view of Fig. 1 shows principally the turbine nozzle, the rim of the turbine wheel including the blades, and the structure defining the motive fluid path adjacent the turbine, which is of the single stage type.

Figure 1:
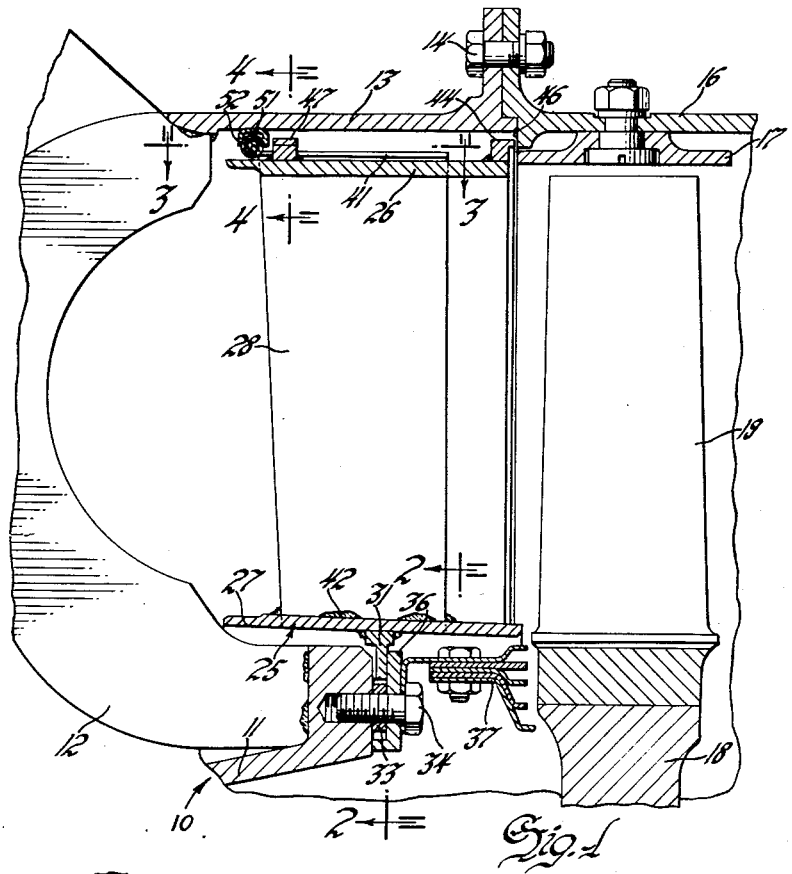
Fig. 1 is a fragmentary sectional view of a gas turbine engine of one type incorporating the nozzle structure of the invention, the section being taken on a plane containing the axis of the turbine.
Figure 3:
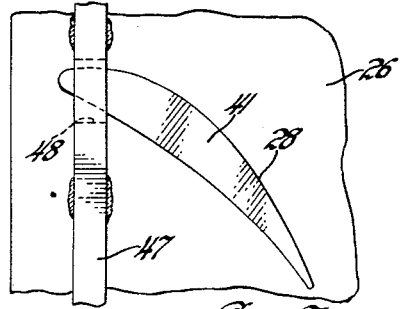
Fig. 3 is a partial plan view of the nozzle projected on the plane indicated by the line 3—3 in Fig. 1.

Referring first to Fig. 1, the frame of the engine interconnecting the turbine and compressor and supporting the main shaft of the engine includes a ring 11 joined by a number of radially extending gusset plates 12 to a turbine nozzle casing 13. The gussets 12 are welded to the ring 11 and casing 13 and thus the members 11 and 12 define a support for the casing from the engine frame 10. Fixed on the turbine nozzle case 13 by bolts 14 is a turbine case 16, within which is mounted a turbine shroud 17. A turbine wheel 18 on which are mounted blades 19 rotates within the shroud 17. Motive fluid is delivered to the turbine from combustion chambers (not illustrated), which are mounted between the ring 11 and casing 13 and extend circumferentially between the gusset plates 12. The motive fluid discharged from the combustion chambers flows directly to a full-admission turbine nozzle indicated generally as 25 and comprising an outer shroud ring 26, an inner shroud ring 27, and nozzle vanes or blades 28 extending generally radially between the shroud rings. The vanes 28 direct motive fluid to the turbine buckets 19 from which it flows into the turbine exhaust duct (not shown).

Figure 2:
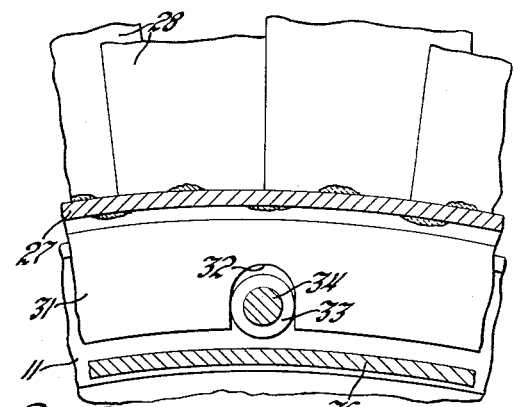
Fig. 2 is a partial elevational view of the nozzle projected on the plane indicated by the line 2—2 in Fig. 1.

The inner shroud ring 27 is mounted on the support ring 11 by means which provide for relative radial expansion of these parts but prevent any axial or rotational movement of the shroud ring. Referring also to Fig. 2, a flange 31 is provided by a ring welded to the inner surface of the shroud ring 27 approximately half way between the leading and trailing edges thereof. This flange 31 is formed with notches or slots 32 which embrace washers 33 mounted on cap screws 34 threaded into the support ring 11. The flange 31 is held against the ring 11 by a ring 36 drawn up against washers 33 by the cap screws 34. The washers are sufficiently thicker than the flange 31 to provide clearance for sliding movement to accommodate relative expansion but, as will be apparent, axial displacement or rotation of the nozzle is prevented and the inner shroud is centered by the coaction of the washers 33 and slots 32, which are relatively numerous.

A labyrinth seal 37 which cooperates with the forward face of the turbine wheel is mounted by means of the cap screws 34.

Figure 4:
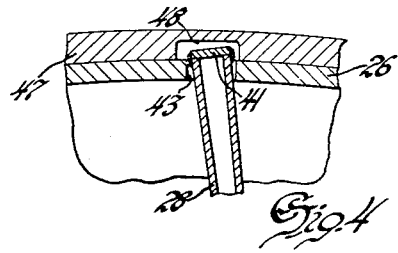
Fig. 4 is a fragmentary section projected on the plane indicated by the line 4—4 in Fig. 1.

The blades or vanes 28 may be formed of folded sheet metal or may be solid, if desired. As illustrated, particularly in Fig. 4, the blade is a hollow sheet metal blade formed by folding and the outer end of the blade is closed by a cap 41 which may be welded or high temperature brazed to the body of the blade. The vanes extend through mating openings in the inner shroud 27 and are welded to the inner shroud 27 so that the vanes are rigid with the inner shroud. The outer end of each vane is slidably mounted in a mating opening 43 in the outer shroud 26. The outer shroud is thus free to expand relative to the blades or the inner shroud but is held against rotation about its axis by the vanes 28. The outer shroud is held against displacement axially of the engine by the vanes 28 and additionally by a ring, strip, or rib 44 welded to the outer surface of the shroud at the trailing edge. The ring 44 is adapted to engage a shoulder 46 on the turbine case 16 but in the inoperative condition of the engine is slightly spaced therefrom. Engagement of the ring 44 and abutment 46 provides an abutment which prevents substantial movement of the outer shroud axially or downstream under the gas load. A second ring, strip, or rib 47 is welded to the outer surface of the shroud 26 adjacent its leading edge. As will be apparent from Fig. 4, the ring 47 is formed with slot 48 which bridge the ends of the vanes 28.

It will be noted that the outer surfaces of the rings, strips, or ribs 47 and 44 are shown as considerably spaced from the inner surface of the turbine nozzle case 13. The drawing illustrates the clearance when the engine is cold. In operation, the nozzle becomes much hotter than the nozzle case and expands relatively thereto so that the outside dimension of the rings 47 and 44 is but slightly less than that of the inside of the case 13; and, if there is any tendency for the turbine nozzle to become distorted and go out of round, the rings 47 and 44 will engage the relatively cool and rigid case (which is additionally stiffened by the bolting flange) to provide an abutment between the rings and case so that the shroud is held against going out of round to any significant extent when the engine is hot. Since the contact is limited by the small width of the rings 44 and 47, heat transfer to the casing is not excessive when the shroud is thus centered. Moreover, engagement of the ends of the nozzle vanes 28 with the ring 47 will, under these conditions, limit any distortion of the inner shroud ring 27 which might otherwise occur.

It will be apparent, however, that because of the construction of the nozzle, there is very little tendency for distortion to be set up. The nozzle does not carry any structural load of the engine and is acted upon only by the gas loads. The shrouds can expand relatively to the support 11 and case 13 and relatively to each other, without setting up any stresses. Thus, any need for segmentation of the shrouds is eliminated.

A seal is mounted between the casing 13 and the outer shroud ring 26 comprising an Inconel braid seal 51 mounted in a channel 52 fixed to the casing.

This application is related to the applications of Wilgus S. Broffitt for "Turbine Nozzle," Serial No. 327,352 filed December 22, 1952 (Patent 2,801,075) and Serial No. 327,353 filed December 22, 1952.

The invention is not to be regarded as limited in any way by the detailed description herein of the preferred embodiment thereof for the purpose of explaining the invention. It will be apparent that many modifications may be made by the exercise of skill in the art within the scope of the principles of the invention.

I claim:

1. A turbine nozzle comprising an annular outer casing an annular support within the casing, a continuous inner nozzle shroud ring including a flange extending radially inward from the shroud ring at a zone intermediate the edges thereof, means mounting the flange on the support with freedom for relative radial expansion, a continuous outer nozzle shroud ring disposed within and adjacent to the casing, means on the outer shroud ring and the casing adapted to provide an abutment to restrain the outer shroud ring against axial displacement by gas loading, nozzle vanes fixed to the inner shroud ring and extending therefrom slidably through openings for the vanes in the outer shroud ring, and a strip fixed to the outer shroud ring extending across the said openings and over the outer ends of the vanes to limit inward displacement of the shroud ring relative to the vanes, the outer shroud ring being radially slidably and circumferentially rotatably mounted in the casing subject to limitation of circumferential movement in the casing by the vanes.

2. A full-admission turbine nozzle comprising an annular outer casing, an annular inner support, means extending from the casing to the support maintaining the casing and support relatively fixed in coaxial relation, a continuous inner nozzle shroud ring, means mounting the inner shroud ring on the support with freedom for relative radial expansion, a continuous outer nozzle shroud ring disposed within and adjacent to the casing, interengaging relatively radially slidable means on the casing and outer shroud ring providing an abutment to restrain the outer shroud ring against axial displacement by gas loading, nozzle vanes extending generally radially from one shroud ring to the other, the vanes being fixed to one shroud ring and extending slidably through openings in the other shroud ring so as to provide for radial expansion, and means on the outer shroud ring and casing defining a rib extending around the perimeter of the shroud ring and a surface on the casing adapted to be closely spaced to the rib upon thermal expansion of the engine so as to engage the rib upon distortion of the shroud ring during operation of the engine and limit such distortion.

3. A full-admission turbine nozzle comprising an annular outer casing, an annular inner support, means extending from the casing to the support maintaining the casing and support relatively fixed in coaxial relation, a continuous inner nozzle shroud ring, means mounting the inner shroud ring on the support with freedom for relative radial expansion, a continuous outer nozzle shroud ring disposed within and adjacent to the casing, interengaging means on the casing and outer shroud ring providing an abutment to restrain the outer shroud ring against axial displacement by gas loading, and nozzle vanes extending generally radially from one shroud ring to the other, the vanes being fixed to one shroud ring and extending slidably through openings in the other shroud ring so as to provide for radial expansion, the outer shroud ring being mounted in the casing so as to be freely rotatable therein except as bridled by the vanes.

4. A full-admission turbine nozzle comprising an annular outer casing, an annular inner support, means extending from the casing to the support maintaining the casing and support relatively fixed in coaxial relation, a continuous inner nozzle shroud ring, means mounting the inner shroud ring on the support, a continuous outer nozzle shroud ring disposed within and adjacent to the casing, nozzle vanes extending generally radially from one shroud ring to the other, the vanes being fixed to the inner shroud ring and extending slidably through openings in the outer shroud ring so as to provide for radial expansion, and means fixed on the outer shroud ring bridging the ends of the vanes and adjacent thereto, the last-named means being closely adjacent the casing upon thermal expansion of the outer shroud ring in operation, so that engagement of the last-named means with the vanes upon inward distortion of the outer shroud ring and with the casing upon outward distortion of the outer shroud ring limits distortion of the outer shroud ring.

5. A turbine nozzle comprising an annular support, a first shroud ring, a second shroud ring, means mounting the first shroud ring on the support with freedom for radial expansion of the ring, the mounting means including means restraining the first shroud ring against rotation around its axis and against displacement along its axis, and nozzle vanes extending from one shroud ring to the other, the vanes being fixed to the first shroud ring and being slidably mounted in the second shroud ring, the second shroud ring being circumferentially rotatably and radially slidably mounted in the support and being located circumferentially by the vanes, and the slidable mounting of the vanes in the second shroud ring providing for radial expansion of the second shroud ring.

6. A turbine nozzle comprising an annular outer casing, an annular support within the casing, a continuous inner nozzle shroud ring, means mounting the shroud ring on the support with freedom for relative radial expansion, a continuous outer nozzle shroud ring disposed within and adjacent to the casing, means on the outer shroud ring and the casing engageable to provide an abutment to restrain the outer shroud ring against axial displacement by gas loading, nozzle vanes fixed to the inner shroud ring and extending therefrom into, and radially slidably mounted in, openings for the vanes in the outer shroud ring, and a rib on the outer nozzle shroud ring normally radially spaced from the casing in the cold condition of the engine adapted to abut the casing upon thermal expansion of the engine in operation to limit outward displacement of the outer shroud ring relative to the casing.

References Cited in the file of this patent

UNITED STATES PATENTS

| | | |
|---|---|---|
| 2,479,573 | Howard | Aug. 23, 1949 |
| 2,488,867 | Judson | Nov. 22, 1949 |
| 2,606,741 | Howard | Aug. 12, 1952 |
| 2,625,013 | Howard et al. | Jan. 13, 1953 |
| 2,625,367 | Rainbow et al. | Jan. 13, 1953 |
| 2,640,319 | Wislicenus | June 2, 1953 |
| 2,643,086 | Thomas et al. | June 23, 1953 |
| 2,801,075 | Broffitt | July 30, 1957 |